United States Patent
Ng

(12) 
(10) Patent No.: US 6,640,301 B1
(45) Date of Patent: Oct. 28, 2003

(54) THIRD-PARTY E-MAIL AUTHENTICATION SERVICE PROVIDER USING CHECKSUM AND UNKNOWN PAD CHARACTERS WITH REMOVAL OF QUOTATION INDENTS

(76) Inventor: David Way Ng, 3044 Whisperwave Cir., Redwood City, CA (US) 94065

( * ) Notice: Subject to any disclaimer, the term of this patent is extended or adjusted under 35 U.S.C. 154(b) by 0 days.

(21) Appl. No.: 09/350,040

(22) Filed: Jul. 8, 1999

(51) Int. Cl.[7] .................. G06F 11/30; G06F 15/16; G06F 17/60

(52) U.S. Cl. .................. 713/156; 709/228; 705/14; 705/26

(58) Field of Search ................ 713/155, 156, 713/159; 705/14, 26; 709/228

(56) References Cited

U.S. PATENT DOCUMENTS

| | | | |
|---|---|---|---|
| 5,651,069 A | 7/1997 | Rogaway | 380/28 |
| 5,771,292 A | 6/1998 | Zunquan | 380/25 |
| 5,898,836 A | 4/1999 | Freivald et al. | 395/200.48 |
| 6,212,265 B1 * | 4/2001 | Duphorne | 379/142 |
| 6,366,950 B1 * | 4/2002 | Scheussler et al. | 709/206 |
| 6,487,189 B1 * | 11/2002 | Eldridge et al. | 370/338 |
| 6,571,290 B2 * | 5/2003 | Selgas et al. | 709/228 |
| 2001/0007098 A1 * | 7/2001 | Hinrichs et al. | 705/14 |

FOREIGN PATENT DOCUMENTS

WO  WO 02/093867 A2 * 11/2002

OTHER PUBLICATIONS

ViaCrypt PGP User's manual, ver. 2.7 For windows Pp 36–39, 1994.

* cited by examiner

Primary Examiner—Norman M. Wright
(74) Attorney, Agent, or Firm—Stuart T. Auvinen

(57) ABSTRACT

Electronic mail (email) is certified and authenticated by an authentication service. The authentication service is integrated with an email web site that allows users to set up email accounts. Outgoing email from the email web site is routed to the authentication service. A message identifier (ID) is generated and added to the message within markers. A random-number generator creates random pad characters that are added to the message before a checksum is generated. The checksum and the pad characters are stored in a table indexed by the message ID. The pad characters and the checksum are placed in secure storage and not available to users or others on the Internet. The email with the message ID in the markers but without the pad characters or checksum is sent to the recipients, along with instructions on how to authenticate the message. Others can authenticate a message by emailing it to the authentication service. The message ID is extracted from the markers and used to find the checksum and pad characters in the table. The pad characters are again added to the message and a new checksum generated. Authentication fails when the checksums do not match. An authentication-result message is added to the message before it is returned. Quotation indent characters are stripped from the message before authentication so that quoted messages can be authenticated even though they are altered by reply software during quotation. Headers such as addresses and dates can be copied to the message body so that they are also authenticated.

23 Claims, 16 Drawing Sheets

-----BEGIN PGP SIGNED MESSAGE----

Thanks for the info. I accept the
quote for $38,702.00.

Do you offer a garentee ?

-----BEGIN PGP SIGNATURE------
RsFUhj==deGeVjikHndWSFERdeoi82
4hnJiQWASFDHFjkhadIU=45KSresdED
-----END PGP SIGNATURE------

FIG. 3A

PRIOR ART

Yes, we offer a guarantee.

-----BEGIN PGP SIGNED MESSAGE----

Thanks for the info. I accept the
quote for $44,702.00.

Do you offer a garentee ?
471
-----BEGIN PGP SIGNATURE------
RsFUhj==deGeVjikHndWSFERdeoi82
4hnJiQWASFDHFjkhadIU=45KSresdED
-----END PGP SIGNATURE------

FIG. 3B

PRIOR ART

Yes, we offer a guarantee.

-----BEGIN PGP SIGNED MESSAGE----

Thanks for the info. I accept the quote for $38,702.00.

FIG. 3C

Do you offer a garentee ?

PRIOR ART

-----BEGIN PGP SIGNATURE------
RsFUhj==deGeVjikHndWSFERdeoi82
4hnJiQWASFDHFjkhadIU=45KSresdED
-----END PGP SIGNATURE------

SPELL CHECK

Yes, we offer a guarantee.

-----BEGIN PGP SIGNED MESSAGE----

Thanks for the info. I accept the quote for $38,702.00.

FIG. 3D

Do you offer a guarantee ?

PRIOR ART

-----BEGIN PGP SIGNATURE------
RsFUhj==deGeVjikHndWSFERdeoi82
4hnJiQWASFDHFjkhadIU=45KSresdED
-----END PGP SIGNATURE------

WARNING:
BAD SIGNATURE, DOESN'T MATCH FILE CONTENTS!

From: "Jim Smith" <jim54@certmailer.com>
To: "David Ng" davidng@yoohoo.com
Cc: "Tom Flores" tflores@si-mail.com
Subject: Terms of Sale
Date: Mon, 14 Jun 1999 11:15:46 -0700

FIG. 8A

I agree to your terms, including the price of
$1,750, payable on July 1st.

-Jim

FIG. 8B

From: "Jim Smith" <jim54@certmailer.com>
To: "David Ng" davidng@yoohoo.com
Cc: "Tom Flores" tflores@si-mail.com
Subject: Terms of Sale
Date: Mon, 14 Jun 1999 11:15:46 -0700

---begin www.certmailer.com certified doc ID 12345---

From: "Jim Smith" <jim54@certmailer.com>
To: "David Ng" davidng@yoohoo.com
Cc: "Tom Flores" tflores@si-mail.com
Subject: Terms of Sale
Date: Mon, 14 Jun 1999 11:15:46 -0700

I agree to your terms, including the price of
$1,750, payable on July 1st.

-Jim

---end ID 12345 eMail certify@certmailer.com to verify---

From: certify@certmailer.com
To: "Tom Flores" tflores@si-mail.com
Date: Fri, 18 Jun 1999 10:15:42 -0700

The document below was certified by certmailer.com.
Email certify@certmailer.com to verify that the document is authentic
and unaltered.  Or visit www.certmailer.com to check the status of this doc.

certmailer.com advertisement: you can certify or verify any document
by sending an email to certify@certmailer.com.  Any alteration to
certmailer.com certified documents will fail verification.

Note:  The document below can not be modified in anyway,
otherwise it will fail verfication.
---begin www.certmailer.com certified doc ID 74500---
---begin www.certmailer.com certified doc ID 12345---

From: "Jim Smith" <jim54@certmailer.com>
To: "David Ng" davidng@yoohoo.com
Cc: "Tom Flores" tflores@si-mail.com
Subject: Terms of Sale
Date: Mon, 14 Jun 1999 11:15:46 -0700

I agree to your terms, including the price of
$1,750, payable on July 1st.

-Jim

---end ID 12345 eMail certify@certmailer.com to verify---
*** certtmailer.com certified document ID 12345
    to be authentic on 6/18/99. ***
---end ID 74500 eMail certify@certmailer.com to verify---

FIG. 8C

From: "David Ng" davidng@yoohoo.com
To: "Jim Smith" <jim54@certmailer.com>
Cc: "Tom Flores" tflores@si-mail.com
Subject: Terms of Sale ---begin www.certmailer.com certified doc ID 78900---

From: "David Ng" davidng@yoohoo.com
To: "Jim Smith" <jim54@certmailer.com>
Cc: "Tom Flores" tflores@si-mail.com
Subject: Terms of Sale Everything looks OK. I'll look for the payment
on the 1st..
-David ---begin www.certmailer.com certified doc ID 12345---

From: "Jim Smith" <jim54@certmailer.com>
To: "David Ng" davidng@yoohoo.com
Cc: "Tom Flores" tflores@si-mail.com
Subject: Terms of Sale
Date: Mon, 14 Jun 1999 11:15:46 -0700

I agree to your terms, including the price of
$1,750, payable on July 1st.

-Jim

---end ID 12345 eMail certify@certmailer.com to verify---

*** certtmailer.com certified document ID 12345
    to be authentic on 6/16/99. ***

---end ID 78900 eMail certify@certmailer.com to verify---

FIG. 8D

From: "Jim Smith" <jim54@peppper.com>
To: "David Ng" davidng@yoohoo.com
Cc: "Tom Flores" tflores@si-mail.com;certify@certmailer.com
Subject: Terms of Sale
Date: Mon, 14 Jun 1999 11:15:46 -0700

I agree to your terms, including the price of
$1,750, payable on July 1st.

-Jim

FIG. 9A

---begin www.certmailer.com certified doc ID 12345---

From: "Jim Smith" <jim54@peppper.com>
To: "David Ng" davidng@yoohoo.com
Cc: "Tom Flores" tflores@si-mail.com;certify@certmailer.com
Subject: Terms of Sale
Date: Mon, 14 Jun 1999 11:15:46 -0700

I agree to your terms, including the price of
$1,750, payable on July 1st.

FIG. 9B

-Jim

---end ID 12345 eMail certify@certmailer.com to verify---

From: certify@certmailer.com
To: "Tom Flores" tflores@si-mail.com
Date: Fri, 18 Jun 1999 10:15:42 -0700

The document below was certified by certmailer.com.
Email certify@certmailer.com to verify that the document is authentic
and unaltered.  Or visit www.certmailer.com to check the status of this doc.

certmailer.com advertisement: you can certify or verify any document
by sending an email to certify@certmailer.com.  Any alteration to
certmailer.com certified documents will fail verification.

Note:  The document below can not be modified in anyway,
otherwise it will fail verfication.
---begin www.certmailer.com certified doc ID 74500---
---begin www.certmailer.com certified doc ID 12345---

From: "Jim Smith" <jim54@peppper.com>
To: "David Ng" davidng@yoohoo.com
Cc: "Tom Flores" tflores@si-mail.com;certify@certmailer.com
Subject: Terms of Sale
Date: Mon, 14 Jun 1999 11:15:46 -0700

I agree to your terms, including the price of
$1,750, payable on July 1st.

-Jim

---end ID 12345 eMail certify@certmailer.com to verify---
*** certtmailer.com certified document ID 12345
     to be authentic on 6/18/99. ***
---end ID 74500 eMail certify@certmailer.com to verify---

---begin www.certmailer.com certified doc ID 78900---

From: "David Ng" davidng@yoohoo.com
To: "Jim Smith" <jim54@certmailer.com>
Cc: "Tom Flores" tflores@si-mail.com
Subject: Terms of Sale
Date: Wed, 16 Jun 1999 17:25:06 -0700

Everything looks OK. I'll look for the payment
on the 1st..
-David

>---begin www.certmailer.com certified doc ID 12345---
>
>From: "Jim Smith" <jim54@certmailer.com>
>To: "David Ng" davidng@yoohoo.com
>Cc: "Tom Flores" tflores@si-mail.com
>Subject: Terms of Sale
>Date: Mon, 14 Jun 1999 11:15:46 -0700
>
>I agree to your terms, including the price of
>$1,750, payable on July 1st.
>
>-Jim
>
>---end ID 12345 eMail certify@certmailer.com to verify---

\*\*\* certtmailer.com certified document ID 12345
    to be authentic on 6/16/99. \*\*\*

---end ID 78900 eMail certify@certmailer.com to verify---

OUTGOING EMAIL

THIRD-PARTY E-MAIL AUTHENTICATION SERVICE PROVIDER USING CHECKSUM AND UNKNOWN PAD CHARACTERS WITH REMOVAL OF QUOTATION INDENTS

FIELD OF THE INVENTION

This invention relates to computer mail systems, and more particularly to authentication of e-mail messages.

BACKGROUND OF THE INVENTION

Electronic mail (email) is likely the most frequently used application of the global network known as the Internet. Short text messages, audio or video clips, and attached files of many different formats can be sent to remote users using email.

Emails are often used as evidence in the court of law, such as during the Microsoft Antitrust trial. Companies are now storing email messages so they can be retrieved as evidence. However, since the contents are in digital form, they can be tampered with or forged. Inventors also may wish to document inventions using email.

Unfortunately, the Internet has not escaped the notice of the more sinister elements of society. Since many email messages are digital-based, it is relatively easy to alter the contents of an email message. Even the email header such as the sender's address or Internet Protocol (IP) routing information can be altered. Such 'forged' email is often sent to large numbers of recipients with a false sender's address. Such email, known as 'Spam', is often an advertisement for pornographic or 'get-rich-quick' web sites. Since the sender's email address is forged, there is no easy way to track down the true sender. The innocent person with the sender's address that was forged often has to suffer abusive comments or 'flames' from recipients of the Spam email.

The growth of electronic commerce (eCommerce) over the Internet has been impeded by the ease of intercepting and forging email. For example, a vendor cannot be sure that the sender actually sent an email requesting purchase of an item. The sender's email address in the header could have been forged. Most eCommerce today is conducted using secure web sites and browsers, such as the secure-sockets-layer (SSL) protocol that operates on top of TCP/IP. While confirmations may be sent by email, actual transactions avoid email due to the lack of security.

The security of email is increased when encryption is used. Encryption software such as Pretty-Good-Privacy (PGP) originally written by Phil Zimmerman can be installed on local personal computers (PCs) to encrypt and decrypt email. Some client email programs such as Microsoft's Outlook allow for the exchange of digital certificates or keys for encryption. However, both the sender and the recipient's computers must have the encryption software installed, and the encryption keys must be exchanged before the email is sent.

Encryption software such as PGP can also authenticate email messages. The message itself does not have to be encrypted. This allows the message to be viewed as clear text by someone without the PGP software. A digital signature is added to the bottom of the email message by the sender's encryption program. The digital signature can be verified by the recipient using the PGP encryption software and an encryption key. Verifying the digital signature also verifies that the message itself was not changed, since the message is mathematically merged into the digital signature. If either the digital signature or the message body is altered, authentication produces a warning message.

CLIENT-SIDE ENCRYPTION/AUTHENTICATION—FIG. 1

FIG. 1 shows email sent over the Internet where email clients authenticate email using encryption software. Email client 14 sends an email message to remote email client 15 over Internet 10. The user of email client 14 first writes the message, then inputs the message to encryption software 16, which attaches a digital signature to the message. The message with the digital signature is then sent from email client 14 to email server 12, which routes the message over Internet 10 to email server 13. Finally the message is delivered to the inbox of remote email client 15. Email servers 12, 13 are typically on server machines of an Internet Service Provider (ISP) or corporate workgroup. Other routers, bridges, and gateways (not shown) are present on Internet 10.

The user of remote email client 15 then copies or inputs the message, with the digital signature, to encryption software 17. Encryption software 17 then uses an encryption key to verify the digital signature and the contents of the message. If the message was altered, encryption software 17 alerts the user with a warning message.

Various email authentication and Internet change-detection schemes are known. See U.S. Pat. No. 5,651,069 by Ragaway, U.S. Pat. No. 5,771,292 by Zouguan, and U.S. Pat. No. 5,898,836 by Freivald et al.

While email can be authenticated, each email client 14, 15 must have his own encryption software loaded on his local PC. Usually the same brand of encryption software (PGP, etc.) must be loaded on each PC. Since relatively few people have PGP software loaded on their PC, most users cannot authenticate PGP digital signatures. The cost of purchasing and installing PGP or other encryption software on each client PC is prohibitive.

Encryption keys must be exchanged separately from the email message, preferably before the digitally-signed email is sent. PGP uses a complementary pair of keys—a public and a private (secret) key. Management of the key-pairs adds unwanted complexity.

EMAIL WEB SITE—FIG. 2

FIG. 2 shows client-side email authentication using a browser to access an email web site. Web sites or services that allow people to set up an email account that can be accessed from any machine on the Internet have become quite popular. Such email web sites are provided by HotMail, Yahoo, Excite, Juno, and others.

Rather than use a local mail server, the user of browser 24 uses email web site 20. The user types text into an input box displayed on browser 24, which is directly input to web site 20 using hyper-text-transfer protocol (HTTP) packets rather than email. Messages are stored at web site 20 in an inbox or sent folders on storage 22. These messages are sent from email web site 20 over Internet 10 to mail server 13 to reach remote email client 15. Of course, email can be sent or received from other email web sites rather than from clients of local mail servers such as remote email server 13.

Although the user of browser 24 does not need email software, encryption software 16 is still needed since email web site 20 does not provide encryption services. Since the user of browser 24 may operate on many different PC's, it is likely that the correct encryption software 16 is not present on all PC's used. Further, the user of browser 24 may not want to leave his encryption keys on some PC's.

Email web site 20 could provide encryption services, but most do not. Since there is often little or no verification needed to open an email account at email web site 20, verification of encryption keys and their ownership is problematic. Thus authentication using digital signatures and encryption is usually not supported by email web site 20. Encryption software 16, 17 on the client PC's is again necessary to attach digital signatures and authenticate email.

DIGITAL SIGNATURES—FIGS. 3A–D

FIG. 3A shows an email message with a digital signature. An email message is composed and input to the PGP encryption software. The recipient's public key is used to generate a digital signature for the message. This digital signature is mathematically generated from both the public key and the message body itself. The digital signature is appended to the message between the lines "—BEGIN PGP SIGNATURE—" and "—END PGP SIGNATURE—". The digital signature ensures that all the message text from the "—BEGIN PGP SIGNED MESSAGE—" until the digital signature has not been altered.

The recipient uses his complementary private key to unlock the digital signature and check the message contents for alterations. The recipient can reply to the message, as shown in FIG. 3B. However, the recipient could alter the message text, such as to increase the agreed-upon price quote. Additional characters such as "471" can be added to the message body so that the authentication software can be fooled. The combination of the additional "471 characters and the altered price form an alias of a checksum of the message text and thus the altered message appears to the encryption software as an unaltered message. Simpler checksum-authentication schemes can be compromised, especially when the checksum algorithm is well-known.

A problem that can occur with spell-checking is shown in FIGS. 3C–D. When the recipient replies to the digitally-signed email, a spell-checker may be used. This spell-checker may detect misspelled words in the original message. If these words are changed, then the original message may appear to be altered.

In FIG. 3C, the original message contains the misspelled word "garentee". When the spell checker is run, the misspelled word is changed to the correct spelling "guarantee" as shown in FIG. 3D. When the message is authenticated, a warning message is generated since the original message was inadvertently changed by the spell-checker. Other software may also alter the original message. For example, many email programs add indent characters ">" to the left margin of each line in the original message. For example, the original message:

Thanks for the info. I accept your quote for $38,702.
Is changed to:
>Thanks for the info. I accept your >quote for $38,702.

The indent characters alter the original message so that authentication fails. It is desirable to be able to authenticate an embedded email message that has had indent characters added to the beginning of the original message's lines. Some tools such as Microsoft's Outlook add formatting or hidden characters. It is desirable to authenticate these messages.

While digital signatures are useful, it may be possible to alter a message that is authenticated with a simple checksum by adding other characters to form an alias of the original checksum. A more robust checksum method is desired that uses an extra variable that is unknown to both the sender and recipient. It is desired to store the checksum and the extra variable at a secure, third-party web site so that the checksum and the extra variable are not available to the sender or recipient. It is desired to stored the checksum and the extra variable at a third-party web site such as an email web site.

It is desirable to eliminate the encryption and authentication software from the client PC's. It is desired to locate the email authentication software on the email web site. It is desired to integrate email authentication with an email web site. A web site that authenticates email is desired. It is also desired to authenticate embedded email messages that are quoted within another email message.

SUMMARY OF THE INVENTION

An authentication service provider has an identifier (ID) generator that generates an authentication ID. The authentication ID is unique for at least a portion of an electronic-mail (email) message.

A message merger receives the authentication ID from the ID generator. It inserts the authentication ID into the email message. A checksum generator generates a checksum for the email message.

A table has entries each containing a checksum. The authentication ID selects an entry in the table containing a stored checksum for the email message identified by the authentication ID. The checksum from the checksum generator is written to the table into an entry identified by the authentication ID. The checksum written to the table is a stored checksum.

An identifier (ID) extractor is coupled to scan email messages for the authentication ID. When the ID extractor finds an authentication ID in the email message, the checksum generator receives the email message and generates a new checksum for the email message.

A comparator receives the new checksum from the checksum generator and receives the stored checksum from the table. It signals a successful authentication when the new checksum matches the stored checksum from the table. A result indicator is coupled to the comparator. It signals when the comparator signals the successful authentication, but signals an altered indication when the comparator does not signal the successful authentication. Thus email messages are tagged with the authentication ID which later selects a stored checksum in the table. The stored checksum is used to signal successful authentication or alteration of the email message.

In further aspects of the invention a result marker marks the email message with the result indication from the result indicator. A random-number generator generates a random number for input to the message merger. The message merger merges the random number with the email message before input to the checksum generator. A random-number field is included in each entry in the table. The random-number generator writes the random number to the random-number field in the entry in the table selected by the authentication ID when the checksum is written to the entry.

The random number from the table is merged with the email message before the new checksum is generated by the checksum generator. The random number causes a different checksum to be generated for the email message. Thus the random number is stored with the checksum in the table, the random number being merged with the email message prior to checksum generation.

In still further aspects the random number from the table is a seed or parameter to the checksum generator. The random number is not added to email messages sent over an Internet but is only added to messages input to the checksum generator. Thus the random number is not sent over the Internet with the email message but is kept secure by the authentication service provider.

In other aspects the message merger inserts a marker into the email message. The marker contains the authentication ID. The ID extractor scans the email messages for the marker that contains the authentication ID. Thus the authentication ID is in a marker added to the email message.

In further aspects the marker contains an email address of the authentication service provider. The email address is used to return email tagged with the marker to the authentication service provider for authentication.

In other aspects the message merger inserts a copy of headers for the email message. Thus a copy of the headers for the email message is also authenticated.

In further aspects a character filter is coupled to receive the email message. It removes a target character added by an email program. The character filter sends the email message with the target characters removed to the checksum generator. Thus target characters are removed before the checksum is generated. In further aspects the target character is a quotation-indent character ">" at a beginning of a line of text.

In other aspects an email web site includes tools to compose, send, receive, and read email from the Internet. The email web site allows users to send and receive email. Email sent and received from the email web site is sent to the authentication service provider for tagging with the authentication ID and for checksum comparison for authentication before being sent to the Internet or received by users of the email web site. Thus email authentication is integrated with the email web site.

BRIEF DESCRIPTION OF THE DRAWINGS

FIG. 3A shows an email message with a digital signature.

FIG. 3B shows the recipient replying to the message.

FIGS. 3C–D show a problem that can occur with spell-checking.

FIGS. 8A–D show an example of authentication when the user has an account at the email web site with the authentication service.

FIGS. 9A–D show an example of authentication when the user does not have an account at the email web site with the authentication service.

FIG. 11 shows indent characters commonly used for quoting a previous email message.

DETAILED DESCRIPTION

The present invention relates to an improvement in email authentication. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that authentication of email messages can be provided by email web sites. The inventor realizes that security can be enhanced if the encryption keys, checksums, and other variables used by the encryption software are kept local to the email web site and are not accessible to senders and recipients. Senders and recipients then cannot alter messages in such a way to generate an alias of the original checksum since they do not have access to the variables of authentication.

The inventor has further realized that client PCs no longer need a copy of encryption/authentication software when a third-party web site handles all aspects of email authentication. Thus authentication can be provided to many users with little or no cost to the end users. Authentication software does not have to be purchased for each client PC.

The inventor realizes that such third-party email authentication can be provided as a stand-alone service or as a service added to an email web site. Senders or recipients can request authentication of a message that is sent to the authentication web site.

Figure 1:
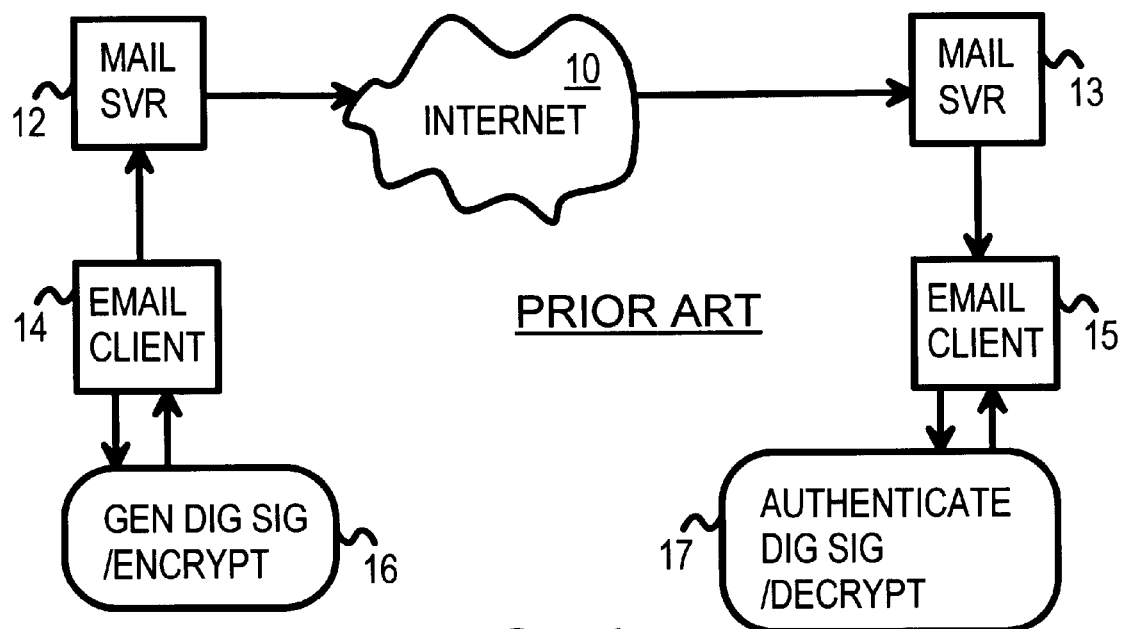
FIG. 1 shows email sent over the Internet where email clients authenticate email using encryption software.
Figure 2:
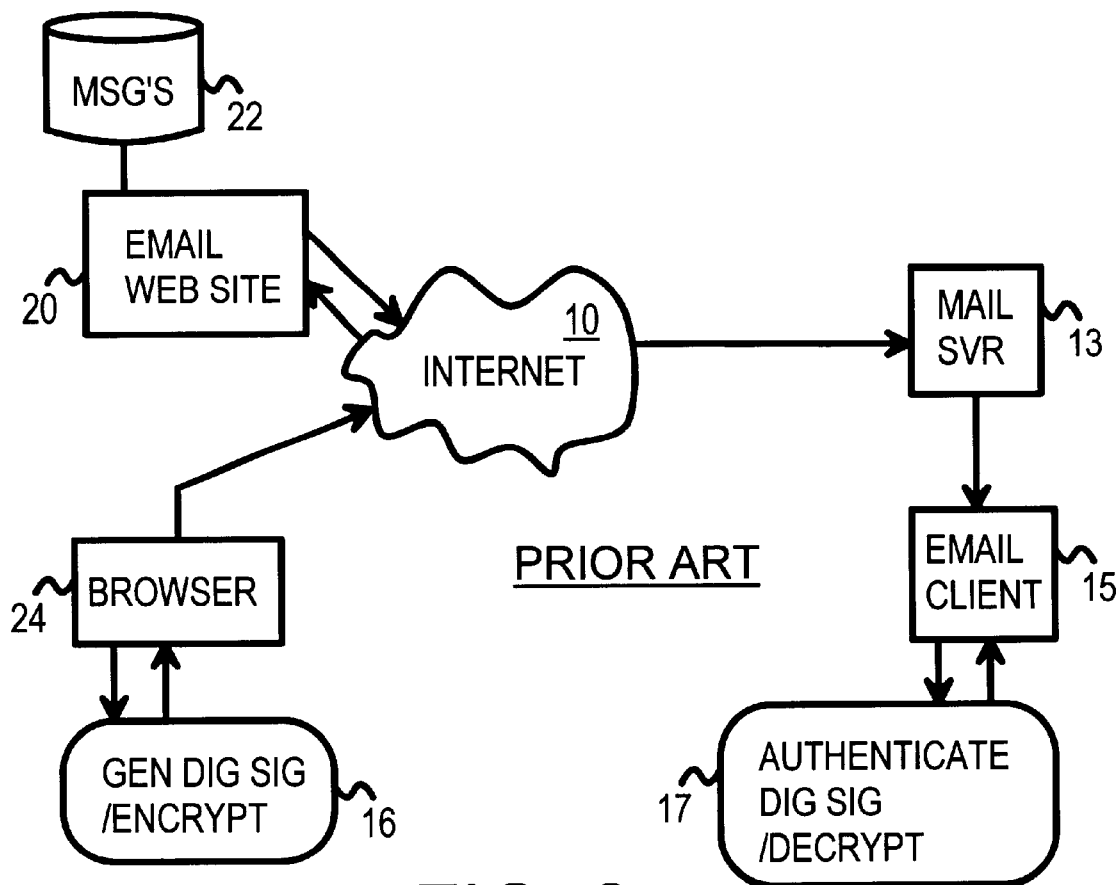
FIG. 2 shows client-side email authentication using a browser to access an email web site.
Figure 4:
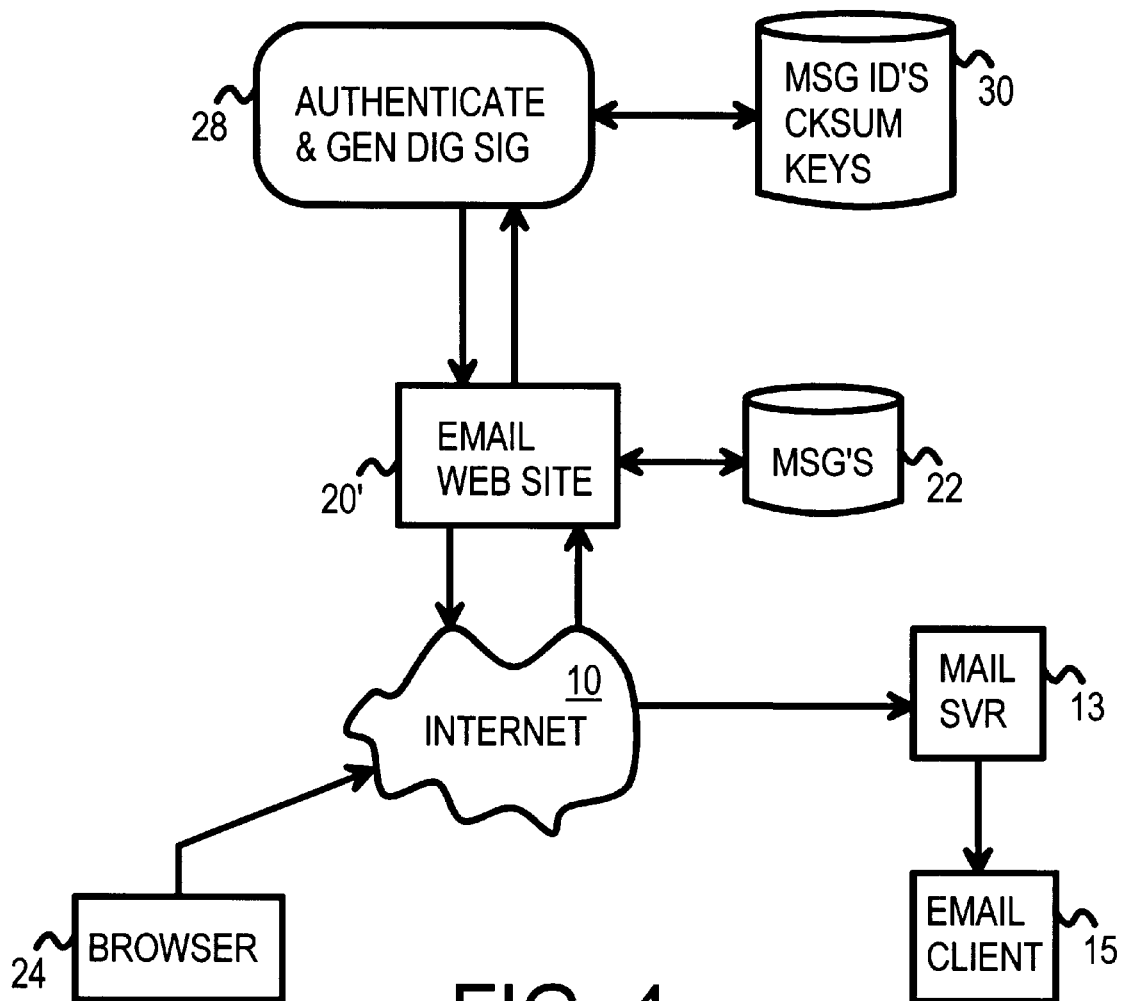
FIG. 4 is a diagram of an email web site that authenticates email messages sent over the Internet.

FIG. 4 is a diagram of an email web site that authenticates email messages sent over the Internet. The user of browser 24 connects to email web site 20' to send and receive email, while the user of email client 15 has local email software that receives email from mail server 13 at the user's Internet Service Provider (ISP) or corporate mail server.

When the user of browser 24 sends email, he connects to email web site 20' through Internet 10. The user's sent messages and received messages (inbox) are stored on message storage 22 at email web site 20' rather than on the user's local PC or a local mail server. This provides a measure of privacy since messages are not stored on local PCs such as at a place of employment that might otherwise monitor employee's email messages. The user's email may be accessed through any computer connected to Internet 10, including office and work PC's. Messages are sent directly from email web site 20' to other users on Internet 10, such as email client 15.

Authentication of email messages is also provided by email web site 20'. Authentication service 28 is available to users of email web site 20'. For example, the user of browser 24 can have a message sent to authentication service 28 before being sent to email client 15. Authentication service 28 then generates a checksum of the message and stores the checksum and any encryption keys along with a message ID on secure storage 30. Before sending to email client 15, the message is modified by authentication service 28 to include the message ID and instructions on how to check the messages authenticity.

The user of email client 15 can later check the authenticity of the message by sending a copy to authentication service 28, by sending an email request through Internet 10 to email web site 20'. Authentication service 28 then scans the email request for the message ID. The checksum and any encryption keys are retrieved from secure storage 30, while new checksum for the message in the request is generated. When the new checksum matches the stored checksum from secure storage 30, then the message is authenticated, and email client 15 is notified by a return email. When the new checksum does not match the stored checksum on secure storage 30, then an email is sent to email client 15 indicating that the message failed authentication. Optionally, the returned email is again certified to protect the results of verification, and to prevent forgery of verification results.

TABLE STORES CHECKSUM AND MESSAGE ID'S—FIG. 5

Figure 5:
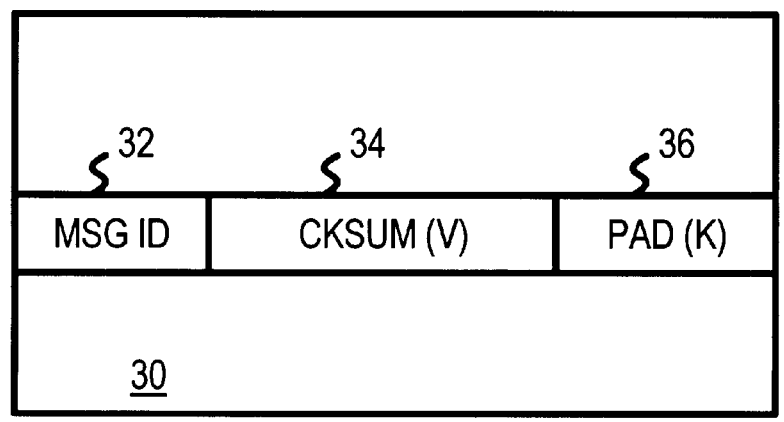
FIG. 5 is a diagram of a record in the secure storage for the email authentication service.

FIG. 5 is a diagram of a record in the secure storage for the email authentication service. Secure storage 30 is not readable by users on the Internet. Only the authentication service can read secure storage 30. The records in secure storage 30 are indexed by a unique authentication or message identifier (ID). This message ID is attached to or embedded in email that is sent to the authentication service. When a new email message without a message ID is received by the authentication service, a new message ID is generated and attached to the email before it is returned to the sender and sent to the recipients. A checksum such as a cyclical-redundancy-check (CRC) checksum is generate for the email message and stored in checksum field 34 along with the message ID in field 32.

When a message received by the authentication service contains a message ID, a table in secure storage 30 is looked up for a record with the matching message ID. The checksum is read from the matching record and compared to a newly-generated checksum for the message to be authenticated. When the checksums match, a successful-authentication email message is sent to the requestor; when the checksums mis-match, an authentication-failure message is sent to the requester. Optionally, the returned email is again certified to protect the verification results.

Since the checksums are stored, the original message does not have to be stored. This significantly reduces the storage requirements for secure storage 30.

DELIBERATE CHECKSUM ALIASING PREVENTED BY PAD CHARACTERS

Aliasing is a potential problem with condensed checksums. Although unlikely, two different messages could have the same checksum, giving a false authentication. Longer checksums can reduce the probability of aliasing.

Since checksum algorithms are fairly well-known, it is possible that an unscrupulous person could alter a message so that the altered message has the same checksum as the original message. The person could search for checksum aliases by testing different alterations to the message. FIG. 3B showed an example where a person altered the price in a message, but also added a text string ('471') that caused the checksum of the altered message to be an alias of the original checksum.

Such checksum aliasing is discouraged by using a second variable when generating the checksums. This second variable is unknown to users and is kept secure within the authentication service's storage. This second variable consists of padding characters that are added to the original message before the checksum is generated. These pad characters can be a randomly-generated string or number.

The pad characters (variable K) is stored at the authentication service's secure storage 30 in field 36 along with the checksum and message ID. Since the pad (variable K) and the checksum (variable V) are not known outside the authentication service's secure storage 30, a person has to guess both variables (K and V) in order to generate an alias of the checksum. While a person could use a standard checksum method to generate a checksum for the message, he would not know the pad characters K and thus would generate the wrong checksum.

SENDING EMAIL FOR AUTHENTICATION— FIG. 6

Figure 6:
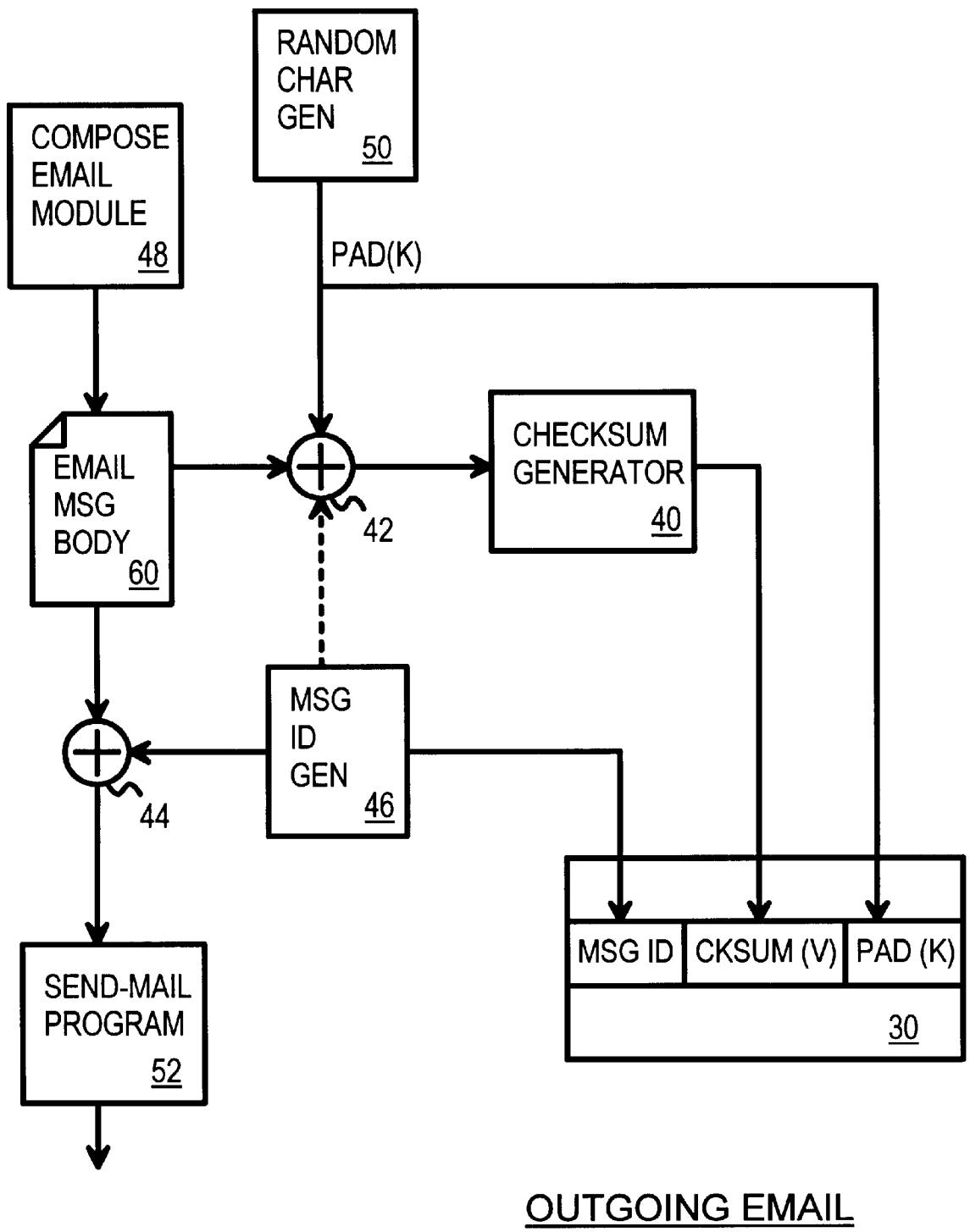
FIG. 6 is a diagram showing email being sent using the authentication service at an email web site.

FIG. 6 is a diagram showing email being sent using the authentication service at an email web site. The user creates a message using compose module 48, which includes a user-interface that is displayed on the user's browser. Normally, the user clicks a 'send' button on the user interface causing the email web site to send the message as email over the Internet. In addition to the 'send' button, an 'Authenticated Send" button is added to the user interface. When the user clicks on the 'Authenticated Send' button, the email is first routed through the authentication service as shown in FIG. 6 before being sent as email over the Internet.

When the user click on the 'Authenticate Send' button in compose module 48, the message body 60 is processed as shown. ID generator 46 generates a unique message ID for this message. This message ID is appended to message body 60 by text appender 44. Preferably, appender 44 adds the message ID and some text explaining how to check the authenticity of the message. The added text can include lines both before and after message body 60. The modified message, with the message ID, is then emailed to the recipients by send-mail program 52. A copy of the email sent can also be stored in the user's sent folder at the email web site.

Random character generator 50 generates a random number or random string of characters, the pad K. This pad K is added to message body 60 along with the message ID from ID generator 46 by message-merger 42. The pad K could simply be appended to the end of message body 60, or inserted within the message body or somehow combined with the message body.

The combined message, pad K, and message ID from message-merger 42 are input to checksum generator 40. Checksum generator 40 generates a checksum (V) for message body 60 after the addition of pad K and the message ID. The checksum V from checksum generator 40 is stored in secure storage 30 along with the message ID from ID generator 46 and the random-number or pad K from random character generator 50.

AUTHENTICATING EMAIL—FIG. 7

Figure 7:
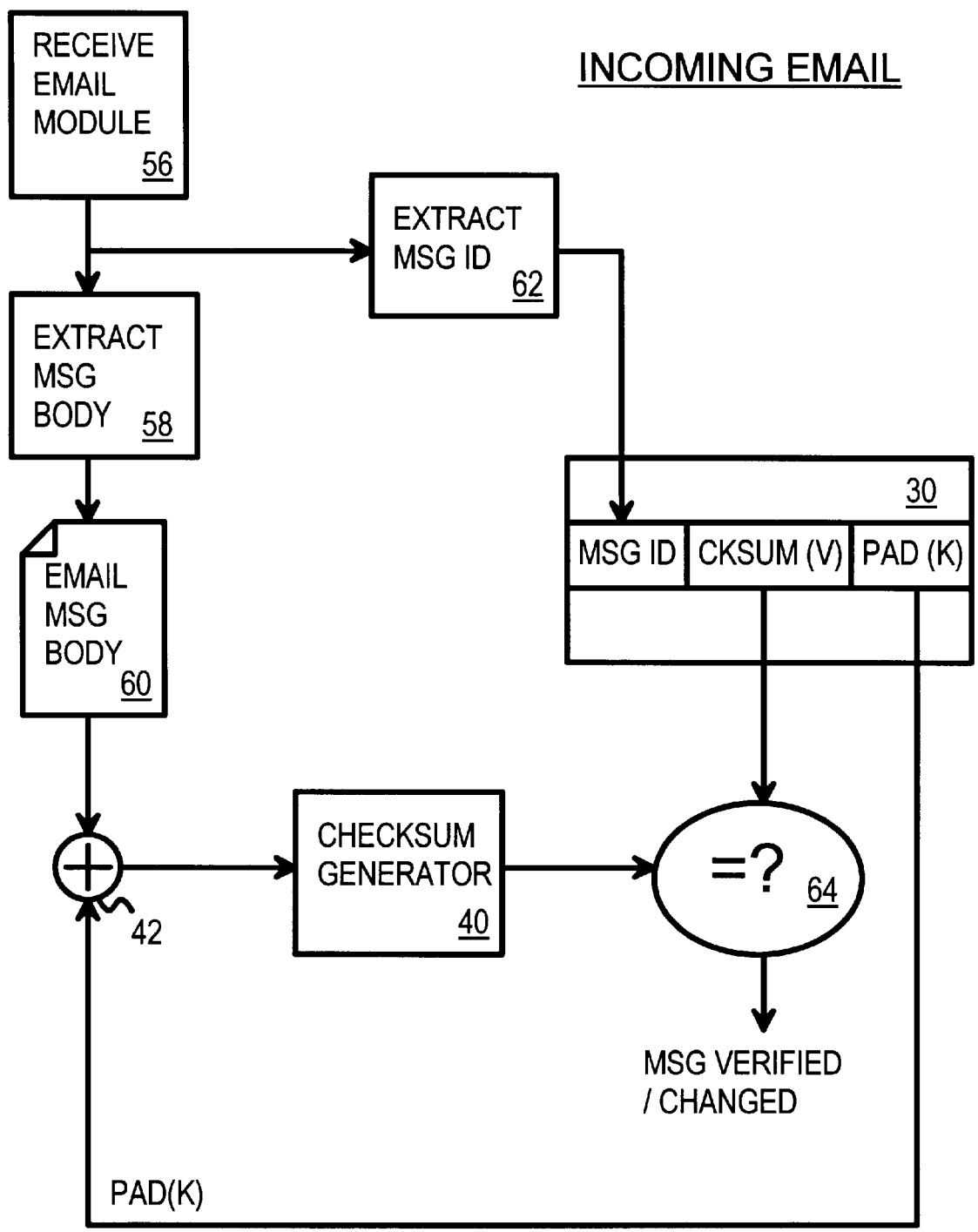
FIG. 7 shows authentication of email using the message ID, checksum, and pad characters stored in the secure storage at the email web site.

FIG. 7 shows authentication of email using the message ID, checksum, and pad characters stored in the secure storage at the email web site. All email messages received at the email web site can be screened for message ID's from the authentication service. When receive email module 56 detects a message ID or markers from the authentication service, the incoming message is processed as shown in FIG. 7.

Extractor 62 extracts the message ID from the message received by receive email module 56. This message ID is sent to secure storage 30 and used to lookup or index the records in the table. The stored checksum V and pad K for the extracted message ID is read from the table. The checksum and pad were stored in the table when the email message was first sent. Now a request has been received to verify the authenticity of that email message.

The message body 60 is extracted by body extractor 58 from the email message received by receive email module 56. Message-merger 42 receives message body 60 from body extractor 58, and merges it with the pad K that was read from the matching record in the table in secure storage 30. The message ID is already in message body 60 since it was included in the message received by receive email module 56.

Checksum generator 40 receives the merged message, message ID, and pad from message-merger 42 and generated a new checksum V". This newly-generated checksum V" is compared to the checksum V read from secure storage 30 by comparator 64. When the checksums match, the email message is verified to be authentic. An authenticated message can then be added to the email message, and the message sent to the user's inbox or forwarded to the requestor. When the checksums do not match, an authenticate failure message is generated and sent to the inbox or the requestor. The verification results are again certified to protect the results of the verification.

EXAMPLES—FIGS. 8, 9

FIGS. 8A–D show an example of authentication when the user has an account at the email web site with the authentication service. User Jim Smith has an email account at the email web site with the authentication service, "certmailer.com". In FIG. 8A, the message is being sent to David Ng who has an email account at "yoohoo", another email provider. A copy is also being sent to Tom Flores at "si-mail.com". The subject is "Terms for sale", and Jim Smith is agreeing to the terms, including the price of $1,750 and payment by July 1st.

Since the originator of the message, Jim Smith, has an account on the authentication email service, certmailer.com, all of his messages are certified or tagged for later authentication. FIG. 8B shows the message received by the recipients. The authentication service has added markers for certification. After the header, a beginning marker is added:

- - - begin www.certmailer.com certified doc ID 12345 - - -

A copy of the headers, including the sender, recipients, subject and date, are then inserted into the message body. A copy of these headers is added since it may not be possible to add the certmailer marker before the headers of the email message since most email programs on the Internet must find the headers before the message body. Inserting a copy of the headers into the message body ensures that the headers are also authenticated. Since headers are one of the most-frequently altered portions of email, it is important to authenticate headers as well as the message body itself.

After the original message body, an ending marker is added:

- - - end ID 12345 eMail certify@certmailer.com to verify - - -

This marker contains an instruction for the recipient to email the message back to the address certify@certmailer.com to have the message verified or authenticated.

In FIG. 8C, the recipient Tom Flores decides to authenticate the message received from Jim Smith. Tom Flores forwards or emails the received message back to the address certify@certmailer.com as instructed by the markers added to the message received (FIG. 8B). The authentication service then searches the message for the markers and finds ID 12345. This ID is looked up in the table (FIG. 5) and a matching entry is found. The checksum and pad characters are read from the table. The pad characters are added to the forwarded message and a new checksum is generated (FIG. 6). The new checksum is compared to the checksum stored in the table. Since the message was not altered, the checksums match.

The authentication service then adds a message that the email was successfully authenticated. An advertisement is also added. This advertisement can be used to help pay for the authentication service since other companies may be willing to pay to have a small advertisement added to certification responses. The date that the authentication service certmailer.com authenticated the email is also appended to the message after the ending marker of the originally-tagged email. The authenticated message is then sent back to Tom Flores, who can confirm that the message between the original markers was not modified. Thus he can be sure of the agreed-to terms of the sale.

In FIG. 8D, recipient David Ng replies to the sender, Jim Smith, adding that everything is OK and he is expecting the check on the first of the month. When the message is received by the email web site used by Jim Smith, the web site automatically scans the message for any previously-added markers. Markers for message ID 12345 are found within the message quoted by David Ng. The authentication service then verifies message 12345 within the email by extracting the portion of the message body between the beginning and ending markers for message 12345. The new checksum matches, so verification is successful, and a verified message is added to the message below the ending marker for message ID 12345.

The authentication service then adds new markers so that the new message may also be verified. The new message written by David Ng together with the old message ID 12345 are surrounded by new markers for message ID 78900. The headers may be copied, or since the recipient has an email account at the authentication service's web site, the original headers may be hidden from display.

The additional layer of certification (ID 78900) prevents the recipients, Jim Smith or anyone else, from altering the received message. This additional layer could be optionally used only when configured either by the email user or the email web site.

FIGS. 9A–C show an example of authentication when the user does not have an account at the email web site with the authentication service. The original message from sender Jim Smith to recipients David Ng and Tom Flores is shown in FIG. 9A. In this example, user Jim Smith does not have an email account with the authentication service. Instead, Jim Smith has an email account at peppper.com.

To certify the email, the sender adds "certify@certmailer.com" to the copy field (cc:). A copy of the message is then sent to the authentication service provider. In FIG. 9B, the authentication service adds markers with a message ID of 12345. The headers are copied into the message body between the markers. Only the message body is shown in FIG. 9B. Then the message body is sent to each of the sender and recipients using newly-generated email headers (not shown).

In FIG. 9C, the recipient Tom Flores sends a copy of the message, with the added markers, back to the authentication service at a later date to verify the message. The authentication service finds the message ID and looks it up in the table. The pad characters from the table are inserted into the message and a new checksum generated. Since the message was not altered, successful authentication messages are added and the message sent back to Tom Flores.

FLOWCHART—FIG. 10

Figure 10:
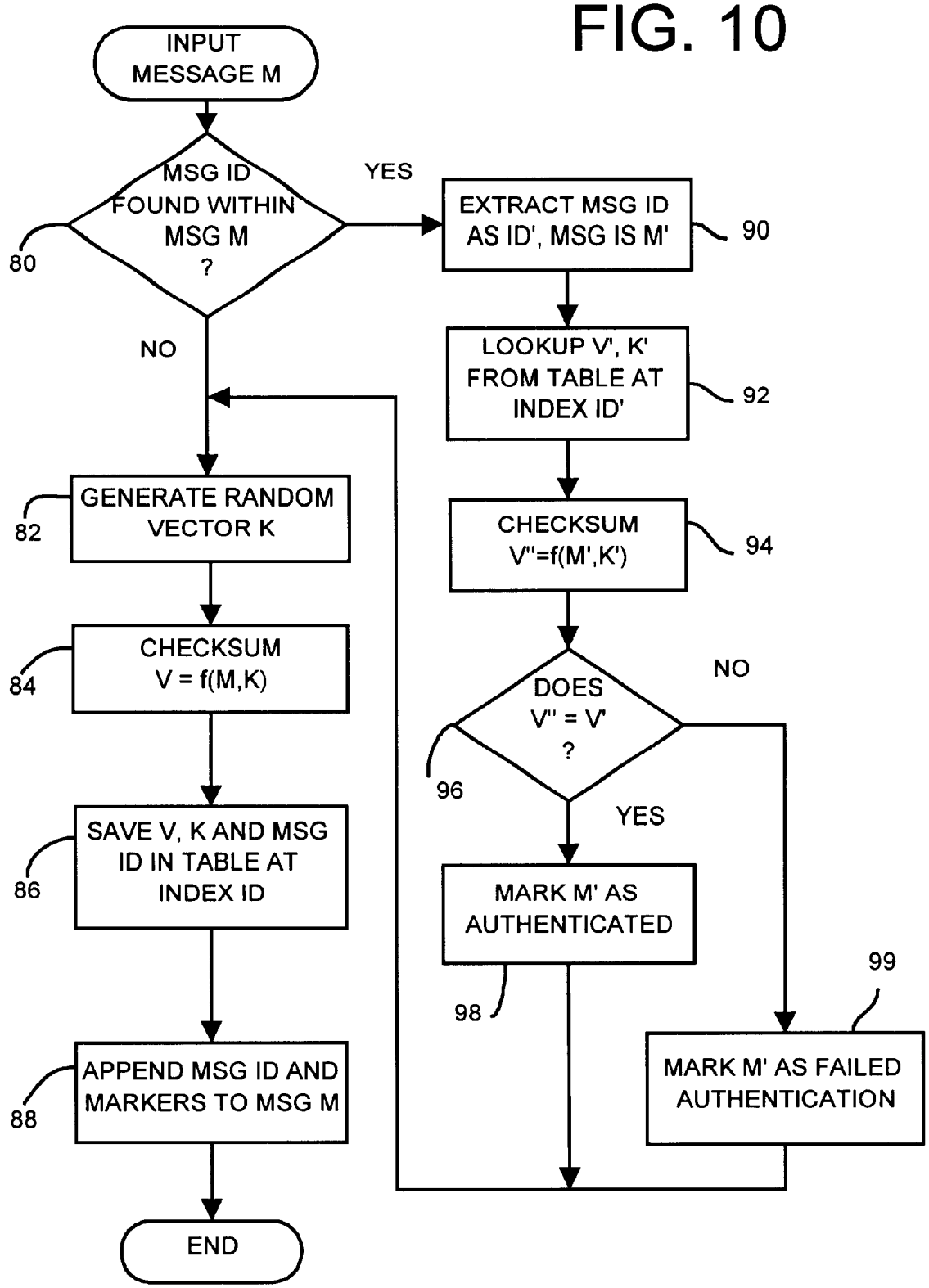
FIG. 10 is a flowchart of message processing by an authentication service.

FIG. 10 is a flowchart of message processing by an authentication service. All messages sent or received from an email web site, or all messages received by an authentication service can be processed using a unified flow as shown in FIG. 10. Explicit instructions to tag or authenticate a previously-tagged message are not required since the flow detects what type of email message is being processed.

The authentication service processes a message by scanning the message for a message ID embedded within a marker. This marker is unique to the authentication service, such as:

- - - begin www.certmailer.com certified doc ID 7375A - - -

If a marker is found, step 80, then the message ID is extracted from the marker as ID', step 90. The table in the secure storage at the authentication service is searched for an entry for the message ID'. The stored checksum V' and pad characters K' are read from the table entry for ID', step 92. The pad characters K' are added to the receive message M' and a new checksum V" is generated as f(M',K'), where f is a checksum function, step 94. When the new checksum V" matches the stored checksum V', step 96, then the message is marked as authenticated by adding text to the message, step 98. Otherwise, when the checksums do not match in step 96, a failed-to-authenticate message is added to the message, step 99. Of course, the pad characters are not included in the message M'.

After verification of the message through steps 98 or 99, or when no message ID was found in the message (step 80), new markers or tags are added to the message. A random-number generator creates the new pad characters K, step 82. These pad characters are added or appended to the message M and a checksum is generated as V=f(M, K), step 84.

The new checksum V and the pad characters K are stored in the table at an index that is determined by the message ID, step 86. The index may also be used to generate the message ID. The message ID itself can also be stored in the table, or just a non-index portion of the message ID can be stored. New markers are created with the message ID and added to the beginning and ending of the message body, step 88. The message body included any authentication messages added by steps 98 or 99, as well as any embedded markers processed by steps 90–96.

The authentication process of steps 90–99 can be looped through for as many times as there are embedded markers. This allows for several layers of nested certification markers. FIG. 10 is a simple, unified process that can process messages from any source, whether to or from an email user at the web site hosting the authentication service, or from an outside email user or address.

QUOTATION INDENTS—FIG. 11

FIG. 11 shows indent characters commonly used for quoting a previous email message. Many email programs and services allow a user to quote a message. The quoted message is often distinguished from the new text by adding indent characters ">" at the left side of each line. In FIG. 11, the certified message with ID 12345 is quoted by indent characters that are added to each line, including blank lines and the markers.

These indent characters are an alteration to the original message and thus can cause an authenticate error. However, such indent markings are so common that it is desirable to pass authentication when the only change is the added quotation indents. Thus an alternate embodiment of the invention is to ignore such quotation indents.

In FIG. 11, a pass-authentication message is added to the message marked by message ID 12345 even though quotation indents have been added to the original tagged message. New certification tags with a message ID of 78900 have been added to the entire message, including the new reply from David Ng and the embedded message (ID 12345).

QUOTATION INDENTS STRIPPED—FIGS. 12, 13

Figure 12:
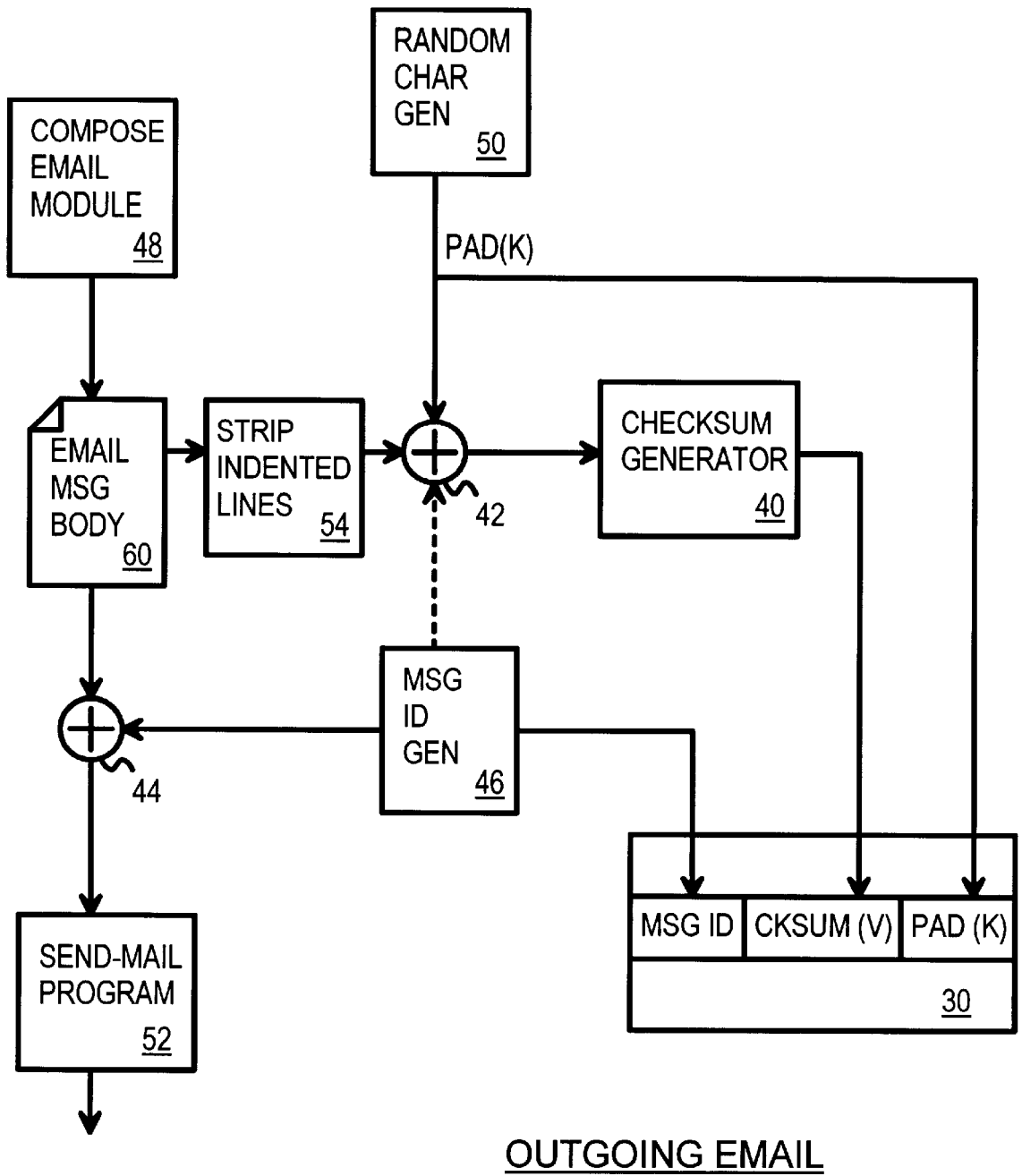
FIG. 12 is a diagram showing quotation-indent removal from email being sent using the authentication service at an email web site.

FIG. 12 is a diagram showing quotation-indent removal from email being sent using the authentication service at an email web site. The user creates a message using compose module 48, which may copy a message being replied to into the new message body. Compose module 48 adds quotation indent characters ">" at the left of each line being quoted from the old email being replied to.

Stripper 54 removes the quotation indents at the beginning of any line in email message body 60. The first character of each line is compared to the indent character ">", and ">"'s are removed. When the first character is an indent, the second and third characters of each can also be checked for indent characters so that a string of indents can be removed, such as ">>>" for a triple-nested quote. Alternately, any occurrence of the indent character ">" can be removed, regardless of its location on a line, although this is less desirable.

The message body, stripped of indent characters by stripper 54, is merged with the message ID from ID generator 46 and the pad characters from random-number generator 50 by message-merger 42. Then checksum generator 40 generates a checksum V from the message without any indent characters. Thus the checksum stored in table 30 represents the document without indent characters.

The message sent by send-mail program 52 includes the message ID in the markers added by text appender 44. The indent characters are also included in the message sent by send-mail program 52, since stripper 54 does not alter message body 60 of the outgoing email.

Figure 13:
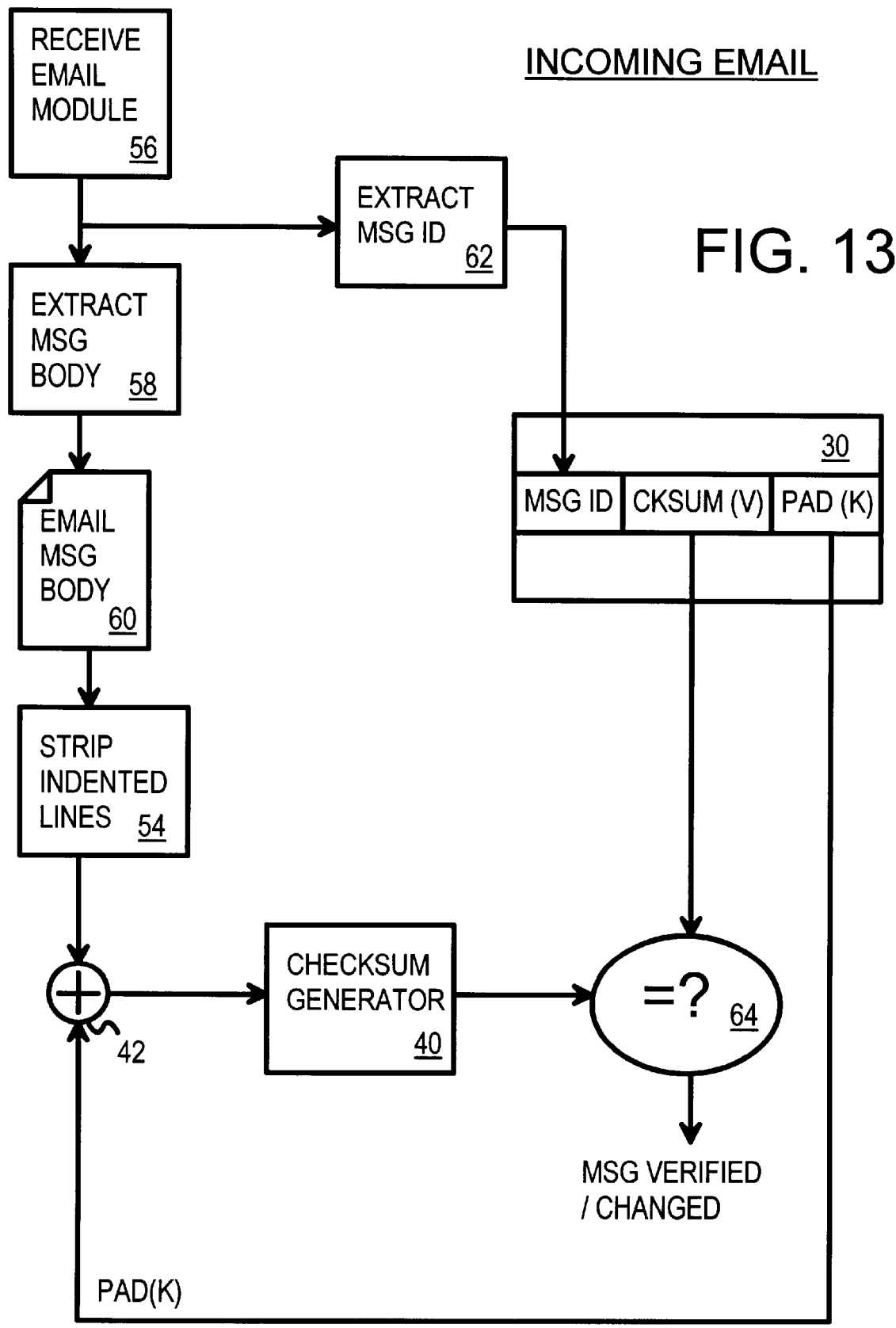
FIG. 13 shows quotation-indent removal during authentication of email using the message ID, checksum, and pad characters stored in the secure storage at the email web site.

FIG. 13 shows quotation-indent removal during authentication of email using the message ID, checksum, and pad characters stored in the secure storage at the email web site. All email messages received at the email web site can be screened for message ID's from the authentication service. When receive email module 56 detects a message ID or markers from the authentication service, the incoming message is processed as previously shown and scribed for FIG. 7. However, stripper 54 is added to remove any leading indent characters from message body 60 before the pad characters are added to the message by message-merger 42 and the message checksumed by checksum generator 40. Since the checksum V' stored in table 30 was also generated after removal of any quotation indents, comparator 64 signals a checksum match even though the message was altered by quotation indents.

When the original message did not contain quotation indents but the new message does contain quotation indents, comparator 64 still signals a checksum match. The stored checksum for the original message which had no quotation indents matches the new checksum from the quoted message since the quotation indents were stripped by stripper 54 before checksum generation.

TABLE STORING CHECKSUM FUNCTION—FIG. 14

Figure 14:
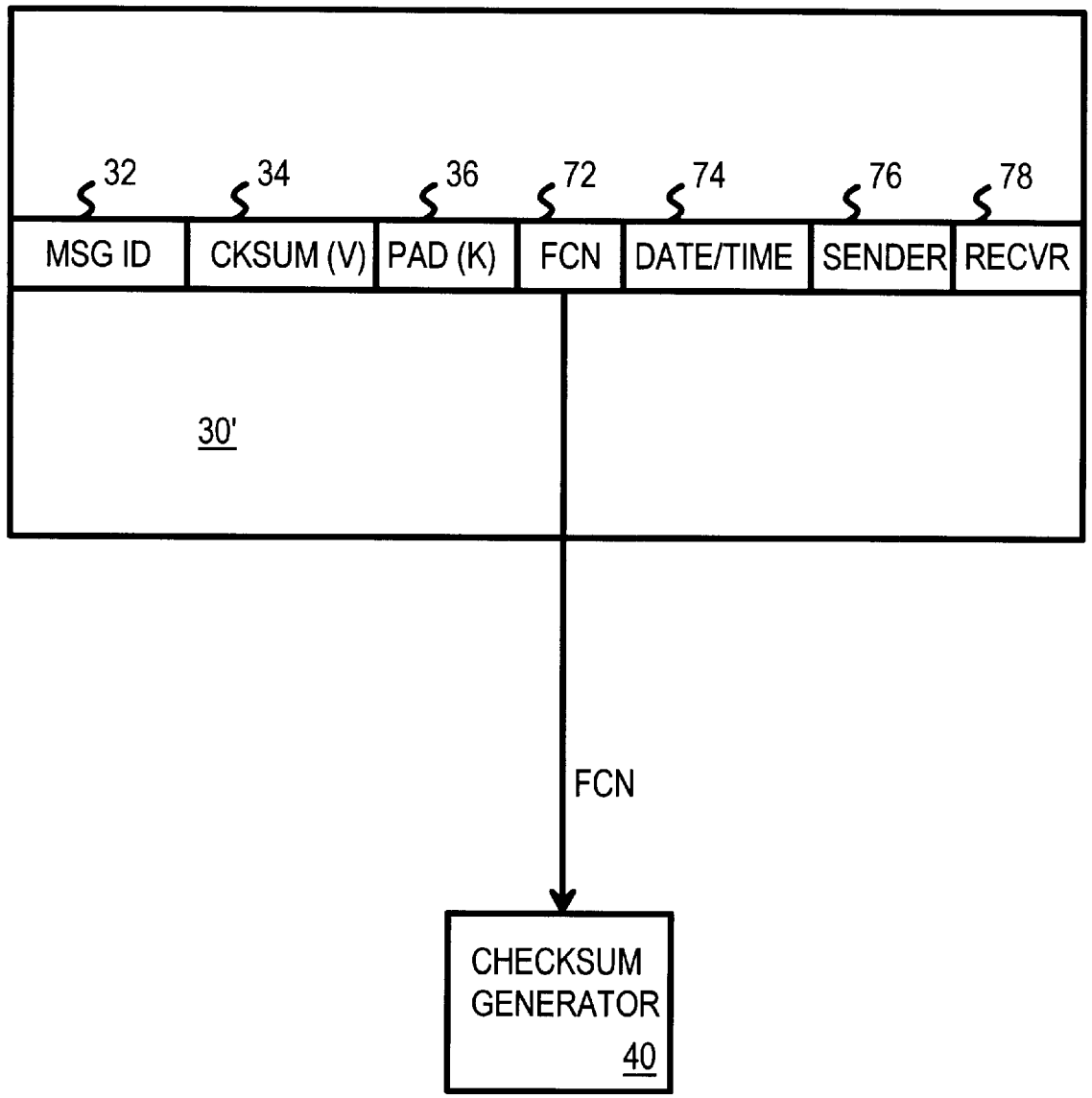
FIG. 14 is an alternate embodiment where the table stores additional information.

FIG. 14 is an alternate embodiment where the table stores additional information. Rather than use just one kind of checksum function for all messages, different checksum or compression methods can be used. These checksum methods can be varied for different messages and applied randomly to the messages so that a user does not know which method is used. This increases security of the authentication process.

Checksum generator 40 receives a function-select signal from table 30'. This function-select signal can be a code that causes checksum generator 40 to alter the method used to generate the checksum. Function field 72 is an additional field in an entry in table 30' that holds the function code used to generate the original checksum V stored in field 34 for the message ID in field 32.

In addition to the pad characters stored in field 36, other useful information can be stored in the entry. For example, field 74 holds the date-time stamp of the message or the certification, while field 76 contains the sender's ID or email address while field 78 contains the recipient's email address or ID.

Table 30' could be searched for matching sender's or recipient's addresses, or a matching time stamp. The timestamp could be used as the index rather than the message ID.

ADVANTAGES OF THE INVENTION

A more robust checksum method uses an extra variable that is unknown to both the sender and recipient. The checksum and the extra variable are stored at a secure, third-party web site so that the checksum and the extra variable are not available to the sender or recipient. The checksum and the extra variable are stored at a third-party web site such as an email web site.

Encryption and authentication software from the client PC's is not needed. Rather, the email authentication software is located on the email web site. Email authentication is integrated with an email web site. The web site authenticates email as it is sent or received. Embedded email messages that are quoted within another email message can also be authenticated, even when the message is altered by quotation indents or other markings. The message can be opened, copied or replicated, but any tampering with the contents is detectable.

There are several differences between encryption, digital signatures, and the authentication service. Encryption prevents uninvited guests from viewing the contents of the message. Digital signatures verify the sender and receiver. Together, encryption and digital signatures verify the sender and receiver and prevent others from viewing the contents of the message. In contrast, the authentication service proves that a message is genuine, unaltered, not tampered with, and unmodified. The authentication service can work in conjunction with both encryption and digital signatures, but provides a different kind of service.

Tagged email may be furnished to a court of law as evidence. The judge, jury, and attorneys can each take a copy of the message and independently send it to the authentication server to verify that the email is genuine and unaltered.

The message itself does not have to be stored by the authentication service, since the checksum is stored. The message may be saved in the user's sent folder at the email web service but not on the secure storage. Using pad characters that are added to the message effectively adds an unknown variable to the checksum process, so that standard, published checksum methods can safely be used. Even though known checksum methods are used, the user cannot successfully guess the message's pad characters and thus cannot break the authentication. Thus low-cost or public-domain checksum methods can be used.

ALTERNATE EMBODIMENTS

Several other embodiments are contemplated by the inventor. For example other kinds of files may be authenticated. Audio, video, graphics, and other document files may be emailed or attached to the email and these could be authenticated too. These various multi-media files can also be inserted into an email text message or appended to the end. The markers and authentication results can be separated or detached from the email for viewing by a user at the email web site.

A web site can be set up to allow users to view the status of the certification and verification of messages. The authentication service can promise to keep the records of a message for a period of time; after that, a fee can be charged to keep the record around. Advertisements can be added to messages either inside or outside the certified portion of the message.

Rather than explicitly stored the entire message ID in each record, just a portion of the message ID may be stored as a tag, while the rest of the message ID is used as an index or address of the record in the table. A set-associative cache-type table structure could be used. The message body extracted may or may not include the message ID and other tags added by the certification service. The message ID field could be removed from each entry for tables with many entries, or entries that are indexed by user.

The pad characters are preferably a 128-bit random number that represents 8 or 16 individual ASCII characters. The checksum is also preferably 128 bits, although other sizes and formats can be used. Checksums are non-invertable so that a user could not simply run a reverse function on a checksum to generate the original data. Names of Internet services are fictional and other names besides certmailer.com can be used for the authentication service provider. Encryption can be used with the invention, and either encrypted or non-encrypted messages can be input to the authentication service.

The pad characters can be added at the beginning, end, middle, every N characters, or anywhere in the message. The only requirement is that the verification process know how the pad characters were inserted. This information can be stored in the table.

The pad variable K can also be used as a seed of some checksum function, such as:

$$V(n)=V(n-1)^{M(n)},$$

where $V(0)=K$ and nonzero, and $M(n)$ is nonzero.

The typical checksum function, which breaks a message up into N bits and then takes the sum, doesn't check for the sequential characteristics of the message. Therefore, a function, such as the above, which depends on the sequential characteristics of the message, is preferred.

Only the outermost certification marker needs to be authenticated. The user can remove all layers of certification except the innermost one to keep the message short. In another embodiment, other filters besides the filter for quotation indents are used to ignore hidden characters or formatting characters inserted by programs such as Microsoft Outlook. The type of filter used during certification can be stored in the table and read during verification.

In yet another embodiment, a message can use multiple checksum functions and multiple filters. The functions and filters used are stored in the table. The verification process checks all the functions and filters and reports on which ones passed and which ones failed.

A small program or script can be downloaded from the certification service to the client machine. This program is used to assign a user ID, optionally encrypt an email message, and send it to the authentication web site with an instruction to either tag a new message or authenticate a previously tagged message. Either email or file-transfer protocol (FTP) or other file-transfer methods may be used by the small program to send the message to the authentication service.

The email web site can be used to configure different levels of service for each user or group of users. Some users may want all mail tagged and authenticated, while others may only want authentication on a few messages. These messages can be selected for authentication by an additional send-authenticate button on the email interface. A single authentication service may provide authentication both to local users of an email web site and to users of the Internet at large.

Other characters besides the common indent character ">" can be used for identifying quoted text in a message. In particular, some email applications may generate a quote header that indicates that the quoted message appears next. The quotation stripper can be modified to remove these quote header lines rather than quotation indents. The quotation stripper can also be modified to remove other characters used for quotation indents.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An authentication service provider comprising:
   an identifier (ID) generator, for generating an authentication ID, the authentication ID being unique for at least a portion of an electronic document;
   a message merger, receiving the authentication ID from the ID generator, for inserting the authentication ID into the electronic document;
   a checksum generator for generating a checksum for the electronic document;
   a table having entries each containing a checksum, the authentication ID selecting an entry in the table containing a stored checksum for the electronic document identified by the authentication ID;
   wherein the checksum from the checksum generator is written to the table into an entry identified by the authentication ID, the checksum written to the table being a stored checksum;
   an identifier (ID) extractor, coupled to scan electronic documents for the authentication ID;
   when the ID extractor finds an authentication ID in the electronic document, the checksum generator receives the electronic document, to generate a new checksum for the electronic document;
   a comparator, receiving the new checksum from the checksum generator and receiving the stored checksum from the table, for signaling a successful authentication when the new checksum matches the stored checksum from the table; and
   a result indicator, coupled to the comparator, for indicating when the comparator signals the successful authentication, but for warning when the comparator does not signal the successful authentication,
   whereby electronic documents are tagged with the authentication ID which later selects a stored checksum in the table, the stored checksum used to signal successful authentication or alteration of the electronic document.

2. The authentication service provider of claim 1 wherein:
   the electronic document is an email message; and
   the result indicator comprises:
      a result marker, coupled to the comparator, for marking the email message with a certified indication when the comparator signals the successful authentication, but for marking the email message with an altered indication when the comparator does not signal the successful authentication,
   whereby email messages are marked with an authentication result.

3. The authentication service provider of claim 2 further comprising:
   a random-number generator for generating a random number for input to the message merger, the message merger merging the random number with the email message before input to the checksum generator; and
   a random-number field for each entry in the table, the random-number generator writing the random number to the random-number field in the entry in the table selected by the authentication ID when the checksum is written to the entry;
   wherein the random number from the table is merged with the email message before the new checksum is generated by the checksum generator, the random number causing a different checksum to be generated for the email message,
   whereby the random number is stored with the checksum in the table, the random number being merged with the email message prior to checksum generation.

4. The authentication service provider of claim 3 wherein the random number from the table is a seed or parameter to the checksum generator, the random number causing a different checksum to be generated for the email message.

5. The authentication service provider of claim 3 wherein the random number is not added to email messages sent over an Internet but is only added to messages input to the checksum generator,
   whereby the random number is not sent over the Internet with the email message but is kept secure by the authentication service provider.

6. The authentication service provider of claim 5 wherein the message merger inserts a marker into the email message, the marker containing the authentication ID;
   wherein the ID extractor scans the email messages for the marker that contains the authentication ID,
   whereby the authentication ID is in a marker added to the email message.

7. The authentication service provider of claim 6 wherein the marker contains an email address of the authentication service provider, the email address being used to return email tagged with the marker to the authentication service provider for authentication.

8. The authentication service provider of claim 6 wherein the marker inserted into the email message includes a beginning marker inserted before message text and an ending marker inserted after message text in the email message;

wherein the checksum generator receives the message text between the beginning and ending markers.

9. The authentication service provider of claim 8 wherein the message merger further includes means for inserting a copy of headers for the email message, the copy being inserted after the beginning marker, the headers including a time and a date of the email message, a sender's address and a recipient's address, whereby a copy of the headers for the email message is also authenticated.

10. The authentication service provider of claim 6 further comprising:

a character filter, coupled to receive the email message, for removing a target character added by an email program, the character filter sending the email message with the target characters removed to the checksum generator, whereby target characters are removed before the checksum is generated.

11. The authentication service provider of claim 10 wherein the target character is a quotation-indent character that indicates that a portion of the email message was quoted from another email message whereby quotation-indent characters are removed before the checksum is generated.

12. The authentication service provider of claim 11 wherein the quotation-indent character is a ">" character at a beginning of a line of text.

13. The authentication service provider of claim 6 wherein the result marker also inserts an advertisement into the email message that is authenticated.

14. The authentication service provider of claim 6 further comprising:

an email web site that includes tools to compose, send, receive, and read email from the Internet, the email web site allowing users to send and receive email;

wherein email sent and received from the email web site is sent to the authentication service provider for tagging with the authentication ID and for checksum comparison for authentication before being sent to the Internet or received by users of the email web site, whereby email authentication is integrated with the email web site.

15. The authentication service provider of claim 14, wherein the email web site is a public email service that allows anyone on the Internet to open an email account and authenticate email messages.

16. The authentication service provider of claim 1 wherein the table is in a secure storage that is not accessible by users on an Internet, the users including a sender and recipients of the email message, whereby the checksum and random number are securely stored and inaccessible to Internet users.

17. The authentication service provider of claim 16 wherein the checksum generator uses a function that is publicly known, whereby a standard checksum function is securely used since the random number is not publicly known.

18. The authentication service provider of claim 16 wherein each entry in the table further comprises a function field containing a function code, the function code sent to the checksum generator to alter a checksum function that generates the checksum, whereby different checksum functions are selected by the entry in the table.

19. A method for tagging and certifying electronic mail (email) comprising:

receiving an email message;

scanning the email message for a marker that contains an authentication identifier;

when an authentication identifier is found in the email message:

extracting the authentication identifier and looking for a matching entry for the authentication identifier in a table;

reading a stored checksum and a pad character string from the matching entry in the table;

adding the pad character string to the email message to generate a padded message;

generating a new checksum for the padded message;

comparing the new checksum to the stored checksum;

adding a certified message to the email message when the new checksum matches the stored checksum;

adding a warning message to the email message when the new checksum does not match the stored checksum;

randomly generating a new pad character string;

generating a new authentication identifier for the email message;

adding the new pad character string to the email message to generate a new padded message;

generating a checksum for the new padded message;

storing in an entry in the table the checksum, the new pad character string, and at least a portion of the authentication identifier;

adding a marker to the email message to generate a marked email message, the marker containing the authentication identifier but not containing the new pad character string or the checksum; and sending the marked email message to a recipient, whereby the email message is tagged with the authentication identifier and certified.

20. The method of claim 19 wherein the recipient or a sender of the email message is a user at a public email web site that tagged the email message, the email message being sent over an Internet, whereby certification is provided by the public email web site that tags and certifies email messages.

21. The method of claim 19 wherein neither a recipient nor a sender of the email message is a user at a public email web site that tagged the email message, the email message being sent over an Internet, whereby certification is provided by a third party service provider.

22. A computer-program product comprising:

a computer-usable medium having computer-readable program code means embodied therein for tagging and authenticating electronic mail (email), the computer-readable program code means in the computer-program product comprising:

identifier (ID) generator means for generating an authentication ID;

message-merger means, receiving the authentication ID from the ID generator means, for inserting the authentication ID into an email message;

random-number generator means for generating a random number for input to the message-merger means, the message-merger means adding the random number to the email message;

checksum generator means for generating a checksum for the email message;

table means for storing entries each containing a checksum and a random-number field, the authentication ID selecting an entry in the table means containing a stored checksum for the email message identified by the authentication ID;

wherein the checksum from the checksum generator means is written to the table means into an entry identified by the authentication ID, the checksum written to the table means being a stored checksum;

identifier (ID) extractor means for scanning email messages for the authentication ID;

when the ID extractor finds an authentication ID in the email message, the checksum generator means receives the email message, to generate a new checksum for the email message;

comparator means, receiving the new checksum from the checksum generator means and receiving the stored checksum from the table means, for signaling a successful authentication when the new checksum matches the stored checksum from the table means; and result-marker means, coupled to the comparator means, for marking the email message with a certified indication when the comparator means signals the successful authentication, but for marking the email message with an altered indication when the comparator means does not signal the successful authentication, whereby email messages are tagged with the authentication ID which later selects a stored checksum in the table means, the stored checksum used to signal successful authentication or alteration of the email message.

23. The computer-program product of claim 22 wherein the computer-readable program code means further comprises:

indent-stripper means, coupled to receive the email message, for removing a leading quotation-indent character that indicates that a portion of the email message was quoted from another email message, the indent-stripper means sending the email message with the quotation-indent characters removed to the checksum generator, whereby quotation-indent characters are removed before the checksum is generated.

* * * * *